United States Patent
Cobb et al.

(10) Patent No.: US 6,603,474 B1
(45) Date of Patent: Aug. 5, 2003

(54) METHOD AND APPARATUS FOR OCCLUSION CULLING OF OBJECTS IN A DATA PROCESSING SYSTEM

(75) Inventors: Bradford Lee Cobb, Cedar Park, TX (US); Lee Michael Gross, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/321,787

(22) Filed: May 27, 1999

(51) Int. Cl.[7] ............................................... G06T 15/40
(52) U.S. Cl. ....................................... 345/421; 345/422
(58) Field of Search ................................. 345/421, 422, 345/473, 419, 625

(56) References Cited

U.S. PATENT DOCUMENTS

| | | | |
|---|---|---|---|
| 4,901,252 A | * 2/1990 | Fitzgerald et al. | 345/421 |
| 5,574,835 A | 11/1996 | Duluk, Jr. et al. | 395/121 |
| 5,579,454 A | 11/1996 | Billyard et al. | 395/121 |
| 5,751,291 A | 5/1998 | Olsen et al. | 345/419 |
| 5,777,608 A | 7/1998 | Lipovski et al. | 345/189 |
| 5,808,617 A | 9/1998 | Kenworthy et al. | 345/421 |
| 5,856,829 A | 1/1999 | Gray, III et al. | 345/422 |
| 5,945,992 A | 8/1999 | Cunniff | 345/335 |
| 6,111,582 A | * 8/2000 | Jenkins | 345/421 |
| 6,252,608 B1 | * 6/2001 | Snyder et al. | 345/473 |

FOREIGN PATENT DOCUMENTS

| | | | |
|---|---|---|---|
| GB | 2 284 526 A | 7/1995 | G06T/17/40 |
| JP | 02-079178 | 3/1990 | G06F/15/72 |
| JP | 05-035883 | 2/1993 | G06F/15/72 |
| JP | 06/223199 | 8/1994 | G06F/15/72 |
| JP | 09-297860 | 11/1997 | G06T/15/40 |
| JP | 09-305792 | 11/1997 | G06T/15/40 |

* cited by examiner

Primary Examiner—Mark Zimmerman
Assistant Examiner—Lance W. Sealey
(74) Attorney, Agent, or Firm—Duke W. Yee; Robert M. Carwell (57) ABSTRACT

A method in a data processing system for displaying a drawing for a view point, wherein the drawing includes a set of objects. A plurality of bounding boxes and complexity data for the set of objects is received, wherein a bounding box and complexity data is associated with each object within the set of objects. Occluders within the set of objects using the plurality of bounding boxes is selected. Objects from the set of objects that are visible when compared to the occluders for the viewpoint are identified.

32 Claims, 10 Drawing Sheets

```
cull
====
    Data
    ----
        Input:   array of display lists for objects
                 array of bounding boxes for objects
                 array of complexities for objects
                 length of arrays (=N)
                 flag if display lists have changed from previous call
                 (new scene flag)
                 viewport Output:  array of indices into input object array which represent visible
                     objects
                 length of array Method
    ------
    if (new scene) {
        create N objects corresponding to N display lists;
        initialize each object with {
            # polygons (complexity) in display list;
            display list pointer;
            visibility flag;
            bounding box min and max vertices;
            bounding box area data;
            original display list array index #;
        }
    }
    call occlusion_cull -- returns list of visible objects;
    return;
```

```
// First step is to determine which objects either intersect or
// are completely within the view frustum.
for(i=0; i<nObject; i++) {
            if ( !objectOutsideViewFrustum( object [i] ) ) {
                    viewableObjects[nViewable] = object[i]
                    viewableBoundingBoxes[nViewable] = objectBoundingBox[i]
                    viewableComplexities[nViewable] = objectComplexity[i]
                    viewableComplexity += objectComplexity[i]
                    nViewable++
                    }
            }
```

FROM FIG. 8A

800

```
occlusion_cull
=========
  Data
  ---
    Input:  array of objects
            length of array
            new scene flag
            viewport
            resolution for mini-viewport in occluder selection
            resolution for mini-viewport in occludee test
               Note: In general, occludee mini-viewport resolution >
                                 occluder mini-viewport resolution.

Output: array of visible object indices
            length of array

Method
  -----
  save current graphics state;
  disable dithering;
  concatenate view and projection matrices;
  set flag get_new_occluders = TRUE;
  if (new scene OR get_new occluders)
     call pick_occluders -- returns list of occluders and cull_worthy flag;
  get_new_occluders = !get_new_occluders;
  if cull_worthy {
     clear depth in mini-viewport of back buffer
     disable lighting
     render occluders into mini-viewport of back buffer
     enable lighting
     call test_occlusion -- returns list of visible objects;
  }
  else
     draw everything;
  restore previous graphics state;
  return;
```

```
pick_occluders
=========
   Data
   ---
      Input:  resolution of occluder mini-viewport
              viewport
              array of objects
              length of array
              modelview matrix
              concatenation of modelview and projection matrices Output: array of occluder objects
              length of array
              cull_worthy flag (TRUE if it's worthwhile to proceed with
                                   algorithm; FALSE if it's faster to draw everything)

Method
   -----
   for each object {
      compute the visible area of its bounding box from current view;
      compute the depth of its bounding box's closer side in Z direction;
   }
   store the ranges of visible areas, depths, and complexities for entire list
      of objects in scene;
   for each object
      assign a weight based on visible area, depth, and complexity;
   sort objects by weight;
   pick the first X objects from sorted list to be potential occluders. X is
      determined empirically. The potential occluders must have a total
      complexity less than 3.5% of the total complexity of the scene.
      In addition, X cannot exceed 255;
   clear color and depth in back buffer of occluder mini-viewport;
   for each potential occluder {
      set the current color to a unique value corresponding to object's index;
      render object's unlit bounding box with depth into back buffer of occluder
         mini-viewport;
   }
   read the color buffer from the occluder mini-viewport;
   define the minimum number of pixels necessary to recognize an object as
      min_num_pixels = 0.001 * number of pixels in occluder mini-viewport;
   for each pixel in occluder mini-viewport {
      when an object is found {
         if this object is not already flagged as an occluder {
            flag object as an occluder;
            keep track of total complexity of all occluders;
            check if worthwhile to continue (cull_worthy = occludee_complexity *
                                    weight_factor > occluder_complexity)
         }
      }
   }
   if no occluders are found (objects may be scaled down too small) use first
      object in sorted list as the only occluder
   return;
```

FROM FIG. 9A
900

```
// Use previous information to determine
// if algorithm should be tried.
if ( okayToOcclude ) {
        // Time the occlusion algorithm.
        T_ocb = Timer( occlusionCullBegin )
                doOcclusion( nViewable, viewableObjects, viewableBoundingBoxes,
906             viewableComplexities, nVisible, visibleObjectIndicies,
        T_oce = Timer( occlusionCullEnd )
        T_oc = T_oce - T_ocb // Time the rendering of the visible objects.
        T_rvb = Timer( renderVisibleBegin )
908             visibleComplexity = renderVisible( nVisible, visibleObjectIndicies,
                        viewableObjects, viewableComplexities )
        T_rve = Timer( renderVisibleEnd )
        T_rv = T_rve - T_rvb 910 { // Compute rate at which visible can be rendered.
      R_v = visibleComplexity / T_rv 912 { // Estimate amount of time saved by not rendering
      // the occluded objects.
      occludedComplexity = viewableComplexity - visibleComplexity
      R_o = occludedComplexity / R_v // Determine if algorithm should be used next time.
        if ( R_o > T_oc )
                okayToOcclude = True
        else {
                // Occlusion algorithm took too long. Rather than blindly not
                // do the algorithm again leave the decision to chance.
                okayToOcclude = takeChance
        }
914 }
    else {
        // Render all objects that either intersect or are completely within the
        // view frustum.
        renderVisible( nObject, object )

// Take a chance to see if the next frame should attempt occlusion
        // culling.
        okayToOcclude = takeChance
    }
```

FIG. 9B

METHOD AND APPARATUS FOR OCCLUSION CULLING OF OBJECTS IN A DATA PROCESSING SYSTEM

BACKGROUND OF THE INVENTION

1. Technical Field

The present invention relates generally to an improved data processing system and, in particular, to an improved method and apparatus for rendering drawings in a data processing system. Still more particularly, the present invention relates to a method and apparatus for identifying visible and occluded objects in a data processing system.

2. Description of Related Art

In general, a goal of 3D computer graphics is to create a 2D projection on a display screen of a three-dimensional model as viewed from a predetermined viewpoint in three-dimensional model space. One aspect of such a projection is the need to keep track of which objects are in front of other objects, and which are behind, when viewed from the viewpoint. This knowledge is necessary to ensure that, for example, a building in the foreground will properly occlude a building in the distance. This aspect of the rendering process is known as "occlusion culling".

One popular technique to perform occlusion culling uses a construct known as a "z-buffer". A standard z-buffer linearly associates a number called the "z value", representing the distance from the observer (depth in the scene relative to a projection plane) with each pixel drawn on the screen. When the first object of a scene is projected, attributes of its pixels (such as color) are stored in a "frame buffer", and the z value associated with each pixel is separately stored in the z-buffer. If a second object from the model subsequently projects onto a pixel containing data from the first object, the second object's z value is compared against the z value already stored for that pixel. Only if the second object's z value is less (representing an object closer to the view) will the new pixel and z-buffer be updated with the second object's attributes.

Consider rendering two objects, object 1 and object 2, located at different positive depths from a projection plane or image plane located at z equal to zero in the model space. Object 1 is projected and rendered first. Object 2 is rendered second. The z-buffer prevents pixels of object 2 from being written to the frame buffer in the locations where object 1 has already written pixels with a lesser z value. Thus, object 2 appears in the ultimately displayed image to be behind object 1, as desired.

Z-buffers can be implemented in either hardware or software. The numbers stored can be either floating point or integer values. Any number of bits can be devoted to the z values. In general, the more bits that are devoted to storing the z value, the finer the resolution in distance that can be achieved. Because z values represent the depth of an object in a scene, z values can be more generally referred to as "depth values", and z-buffers can be more generally referred to as "depth buffers". Also, depth values can be increasing with increasing depth, or can be decreasing with increasing depth. Many of the processes used to identify occluded and non-occluded objects take time and add to the time needed to render a scene.

Therefore, it would be advantageous to have an improved method and apparatus for identifying occluded objects.

SUMMARY OF THE INVENTION

The present invention provides a method for displaying a drawing for a viewpoint in a data processing system wherein the drawing includes a set of objects. A plurality of bounding boxes and complexity data for the set of objects is received, wherein a bounding box and complexity data are associated with each object within the set of objects. Occluders within the set of objects are selected using the plurality of bounding boxes and complexity data. These occluders are used to identify visible objects from the set of objects for the viewpoint.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 8A–8D are diagrams of pseudo code used to identify visible objects depicted in accordance with a preferred embodiment of the present invention.

DETAILED DESCRIPTION OF THE PREFERRED EMBODIMENT

Figure 1:
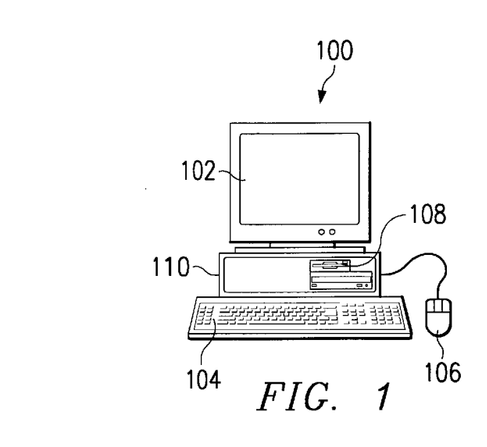
FIG. 1 is a pictorial representation depicting a data processing system in which the present invention may be implemented.

With reference now to the figures and in particular with reference to FIG. 1, a pictorial representation of a data processing system in which the present invention may be implemented is depicted in accordance with a preferred embodiment of the present invention. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100. Personal computer 100 can be implemented using any suitable computer, such as an IBM Aptiva™ computer, a product of International Business Machines Corporation, located in Armonk, N.Y. Although the depicted representation shows a personal computer, other embodiments of the present invention may be implemented in other types of data processing systems, such as network computers, Web based television set top boxes, Internet appliances, etc. Computer 100 also preferably includes a graphical user interface that may be implemented by means of systems software residing in computer readable media in operation within computer 100.

Figure 2:
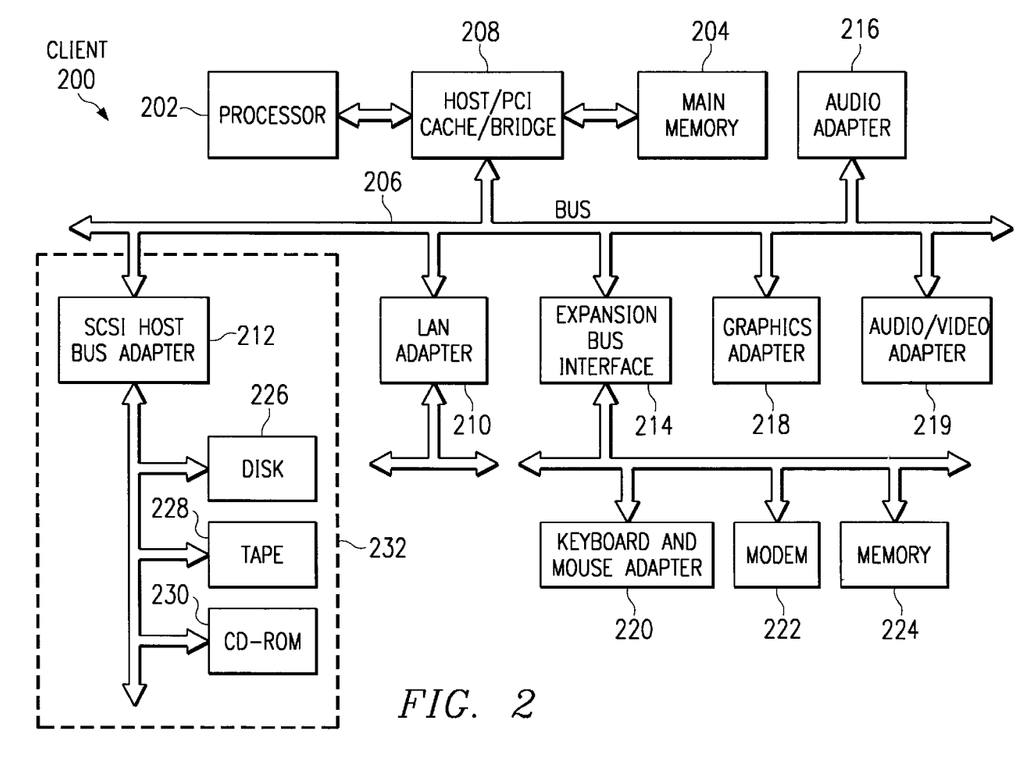
FIG. 2 is a block diagram illustrating a data processing system in which the present invention may be implemented.

With reference now to FIG. 2, a block diagram illustrates a data processing system in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system in which multi-threaded parallel processing is employed to execute occlusion culling processes.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations.

Figure 3:
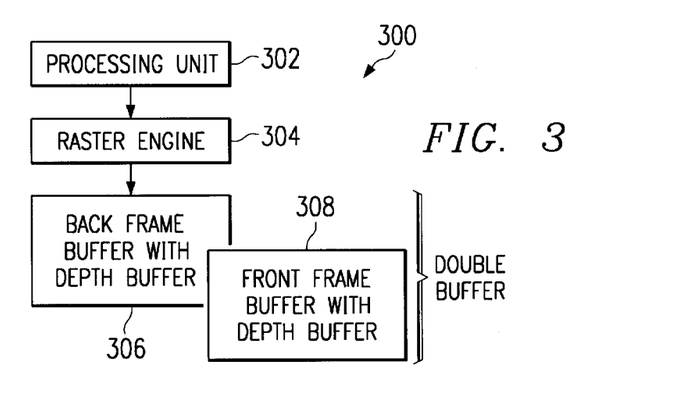
FIG. 3 is a block diagram of a system architecture of a graphics processing system depicted in accordance with a preferred embodiment of the present invention.

Turning next to FIG. 3, a block diagram of a system architecture of a graphics processing system is depicted in accordance with a preferred embodiment of the present invention. Graphics processing system 300 includes a processing unit 302, a raster engine 304, a back frame buffer with depth buffer 306, and a front frame buffer with depth buffer 308. Back frame buffer with depth buffer 306 and front frame buffer with depth buffer 308 form a double buffered graphics system in this example. Depending on the implementation, a virtual frame buffer may be used in place of back frame buffer with depth buffer 306 and front frame buffer with depth buffer 308. In this type of implementation, the occlusion culling process may be performed in a data processing system in which a graphics adapter is absent. The results may be sent to another data processing system that has a graphics adapter. In this example, the occlusion culling process of the present invention may be performed by a server while the actual display of the drawing or scene may be performed by a client.

Processing unit 302 may receive a graphics data stream or a display list for processing. Processing unit 302 may contain one or more processors. Processing unit 302 may take the form of a geometry engine in which primitives are processed and sent to raster engine 304, which transforms the processed primitives into pixels for display. Back frame buffer with depth buffer 306 and front frame buffer with depth buffer 308 are formed from memory used to store data, such as pixel data sets indicating red, green, and blue (RGB) color for pixels. Further, these two buffers store z-axis data also referred to as depth data that is used to determine visibility of an object. These buffers or a back buffer (not shown) are used for storing rendered objects in a small view port in accordance with a preferred embodiment of the present invention. Processing unit 302 may be implemented using various processors in a data processing system. For example, processor 202 in FIG. 2 may be used to perform the functions of processing unit 302. Alternatively, a processor in graphics adapter 218 in FIG. 2 may be used to implement processing unit 302.

Back frame buffer with depth buffer 306 and front frame buffer with depth buffer 308 may be located in a memory in a graphics adapter, such as graphics adapter 218 in FIG. 2. These two buffers also may be implemented in a main memory in a data processing system, such as main memory 204 in FIG. 2.

Figure 4A:
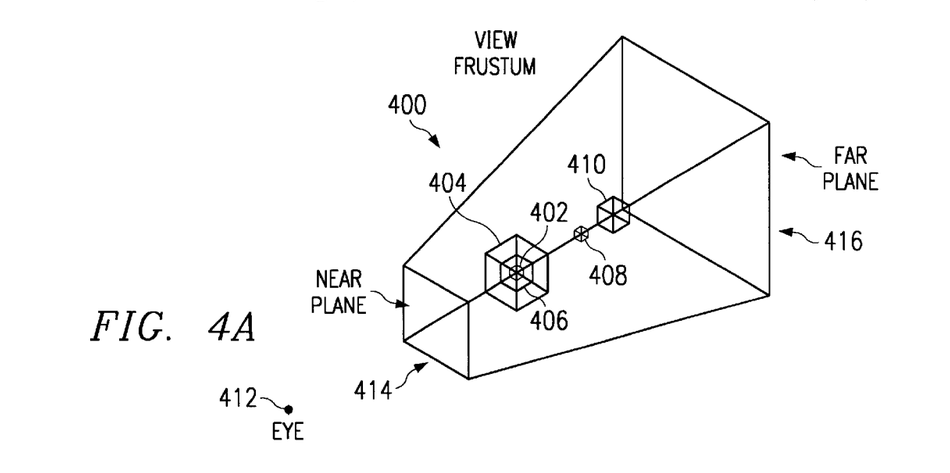
FIGS. 4A–4D are views of objects in a view frustum depicted in accordance with a preferred embodiment of the present invention.

With reference now to FIGS. 4A–4D, views of objects in a frustum are depicted in accordance with a preferred embodiment of the present invention. The objects illustrated in these diagrams are ones in which the occlusion culling processes of the present invention may be implemented. In FIG. 4A, an isometric view of frustum 400 is illustrated with respect to a viewpoint 412. Frustum 400, which is a truncated pyramid, contains objects 402–410. Frustum 400 includes a near plane 414 and a far plane 416. Near plane 414 is the plane closest to viewpoint 412. In an eye coordinate system in which the observer is located at the origin looking down the z-axis in the positive z direction, the field of view is defined by frustum 400. Near plane 414 is also referred to as a front clipping plane and far plane 416 is also referred to as a back clipping plane.

Figure 4B:
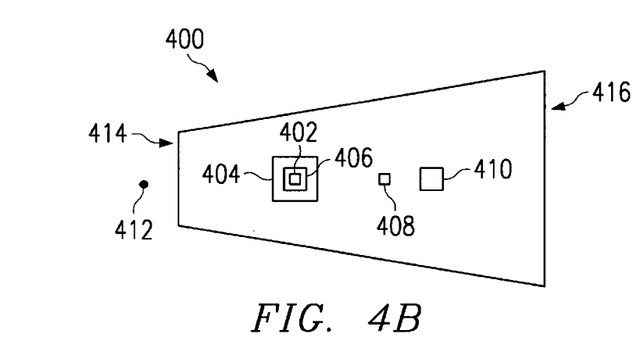
Figure 4C:
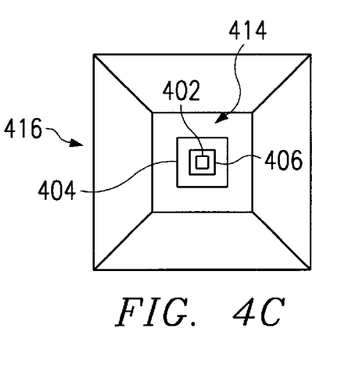
Figure 4D:
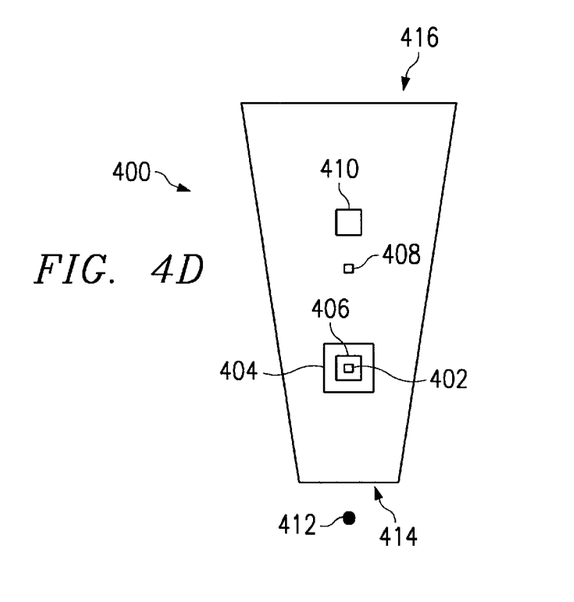

In FIGS. 4B–4D, different views of frustum 400 and objects 402–416 are shown. In these examples, objects 402–406 appear in front of objects 408 and 410. Object 408 is in front of object 410. Thus, from viewpoint 412, objects 408 and 410 are obscured or occluded as can be seen in FIG. 4C. In these examples, objects 402–406 are closer to viewpoint 412 than objects 408 and 410. As a result, the z or depth values of objects 402–404 are less than the z or depth values of objects 408 and 410.

The present invention provides a method, apparatus, and instructions for determining whether objects are visible in a scene, such as the scene in FIGS. 4A–4D. The mechanism of the present invention allows the determination of a minimal set of objects from a given view. The mechanism of the present invention receives as input bounding box and complexity data associated with each object.

A "bounding box" is the smallest three-dimensional axially aligned right parallelepiped, which bounds an object, or one or more polygons, polygon edges, or points. The minimum and maximum x, y, and z coordinates of a bounding box are equal to the minimum and maximum x, y, and z coordinates of the object, polygon(s), polygon edge(s), or points contained by the bounding box, respectively. A "projected bounding box" is a two-dimensional axially aligned rectangle in the viewing plane which bounds a projected object, projected polygon(s), projected polygon edge(s), or projected points. The minimum and maximum x and y coordinates of a projected bounding box are equal to the minimum and maximum x and y coordinates of the projected object, projected polygon(s), projected polygon edge(s), or projected points contained by the projected bounding box, respectively.

The bounding boxes provide a quick rough estimate of the objects of the scene or drawing which are likely to be occluders (visible objects). Once the occluders are identified, the mechanism of the present invention determines whether other objects are visible in the current view for the drawing or scene. Before proceeding to process other objects, however, a decision is made about whether it is worthwhile to continue with the present invention. In the depicted example, this decision is based on the input complexity data.

An object's complexity value is proportional to its rendering time. If the total complexity of the occluders is greater than the total complexity of the remaining objects, then the mechanism of the present invention terminates with the assumption that it will be faster to render the entire assembly than to spend additional time verifying object visibilities. In this case, the number of objects hidden from view with respect to the entire drawing or scene is probably small. Conversely, if the total complexity of the occluders is much less than the total complexity of the remaining objects, then a potential is present to save a great deal of rendering time. Responsive to this situation, the mechanism of the present invention proceeds.

The visibility of an object is verified by first rendering all occluders in full detail with depth information at a low resolution and storing the resulting pixel depth data. A new bounding box is created for the object such that it is axially aligned with the current view. Then, the closest wall of the new bounding box is projected into the scene. This projection is a projected bounding box. "Closeness" is with respect to the viewpoint. The depth of the wall is compared to the occluder depth data obtained as described above. The object is visible if the wall is closer to the viewpoint than the occluder depth value at any pixel within the wall's projected bounding box.

Occluders may be chosen intelligently by picking the parts which have the overall largest visible areas (based on their bounding box), closest depth values to the viewpoint, and lowest complexity values.

Rendering time may be saved during future frames of the same scene by declaring the input part data as static. Occluders may be used for more than one consecutive frame if the viewpoint does not change significantly during those frames.

In the depicted examples, the graphics data and system is described using OpenGL, which is a library for rendering three-dimensional graphics. OpenGL is a trademark of Silicon Graphics Incorporated. Objects are received in the form of display lists. A display list is a named list of OpenGL commands. The contents of a display list may be preprocessed and might therefore execute more efficiently than the same set of OpenGL commands executed in immediate mode.

Figure 5:
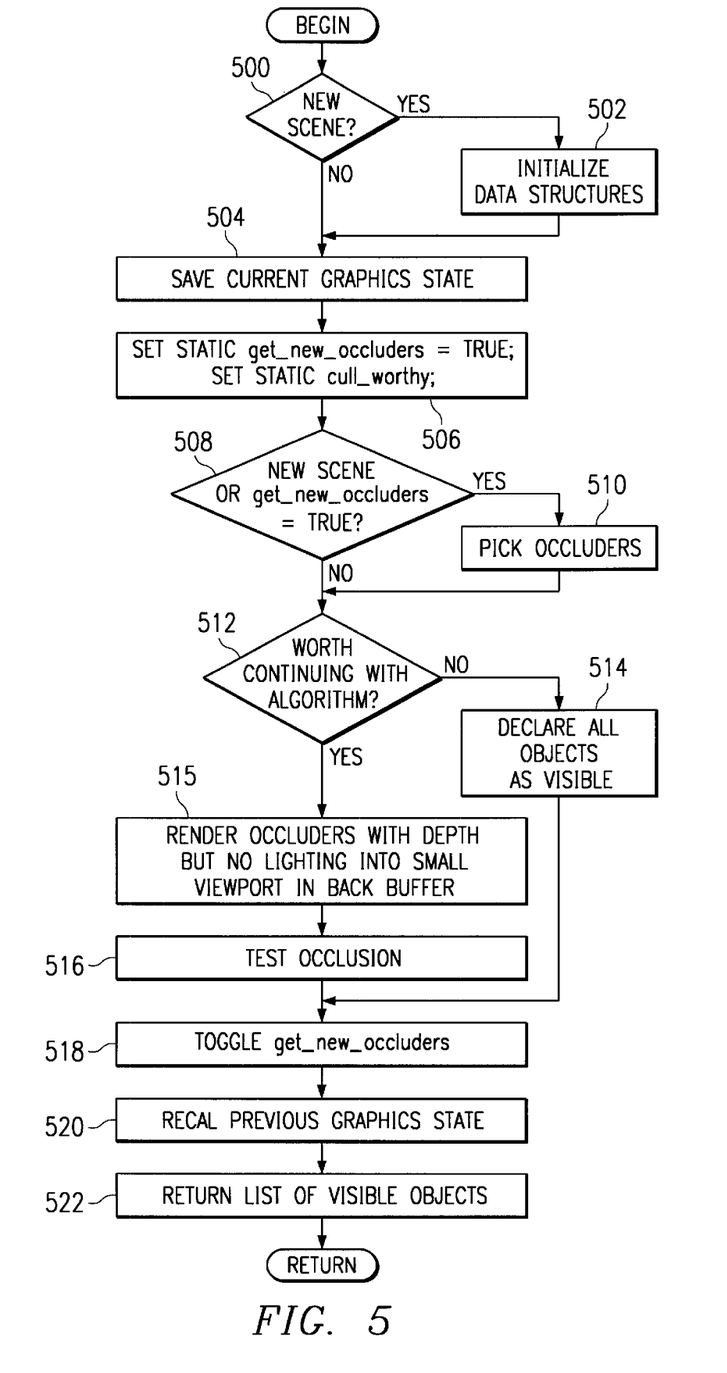
FIG. 5 is a flowchart of a process for identifying a minimal set of objects visible from a given view depicted in accordance with a preferred embodiment of the present invention.

With reference now to FIG. 5, a flowchart of a process for identifying a minimal set of objects visible from a given view is depicted in accordance with a preferred embodiment of the present invention. This process provides occlusion culling based on identifying occluders and using them to determine the visibility of all other objects for a given scene or drawing.

The process receives as input an array of object display lists, an array of object bounding boxes, an array of object complexities, the length of the arrays (equal to the total number of input objects), a new scene flag to indicate whether the object list has been modified, and a viewport. The output from this process is an array of visible object indices referencing the input array of object display lists, and the number of visible objects.

The process begins by checking whether the new scene flag is TRUE (step 500). If the new scene flag is TRUE, data structures are initialized for the new scene (step 502). These data structures associate a visibility status with each object. Bounding box data and complexity data may also be contained in these data structures, as well as bounding box surface area values. The data structures may be implemented as an array or linked list. Then, the current graphics state is saved (step 504). The graphics state is saved because the graphics processing system is used in this example to perform occlusion processing. This processing would otherwise disrupt the graphical display observed by the user. Upon completion of the occlusion processing the graphics state is restored so that the user does not see anything on the display other than the desired scene. If the new scene flag is "FALSE", the process then proceeds directly to step 504 as described above.

Then, two static flags, get_new_occluders and cull_worthy, are declared and get_new_occluders is initialized to a value of "TRUE" (step 506). The flag get_new_occluders is a static flag that is initialized to a value of "TRUE" only the first time the process is run. A determination is then made as to whether the new scene flag is TRUE or whether get_new_occluders is TRUE (step 508). If the new scene flag is TRUE or get_new_occluders is TRUE, then the occluders are picked (step 510). The cull_ worthy static flag is set to either a value of "TRUE" or "FALSE" during the occluder picking step. This step is described in more detail below in FIG. 6.

Thereafter, a determination is made as to whether it is worth continuing with the process based on the value of cull_worthy (step 512). If it is worth continuing with the process (cull_worthy has a value of "TRUE"), then occluders are rendered into the depth buffer only (no color or lighting is stored) in a small viewport in the back buffer (step 515). A viewport is the area of a frame buffer in which pixels are displayed. This is the "occlusion detection viewport". A small viewport is selected to increase the performance of the process because fewer pixels will need to be accessed. Because depth information is the only information required for this step of the process, lighting calculations are disabled. This rendering results in the storage of depth values for the occluders. If any occluders overlap, then the depth values of the occluders closest to the eye will be stored.

Next, a test for occlusion is made for all objects not chosen as occluders in step 510 (step 516). The flag get_new_occluders is then toggled (step 518). The toggling of this flag results in the picking of occluders only every other time the scene is displayed. Of course, the process may be run every time depending on the implementation. For example, if a smooth rotation of the objects occurs, then the occlusion process may be run every other frame in the depicted example. If rotations occur in large increments such as 90 degrees or 180 degrees, then the process may be run each time.

Then, the previous graphics state is recalled (step 520) and a list of visible objects is returned (step 522) with the process returning thereafter. This list of visible objects is an array of indices referencing the input list of objects in the scene.

With reference again to step 512, if the process is not worth continuing, then all objects are declared as visible (step 514) with the process then proceeding to step 518 as described above.

With reference again to step 508, if the new scene flag is FALSE and get_new_occluders is FALSE, the process proceeds directly to step 512 as described above.

Figure 6:
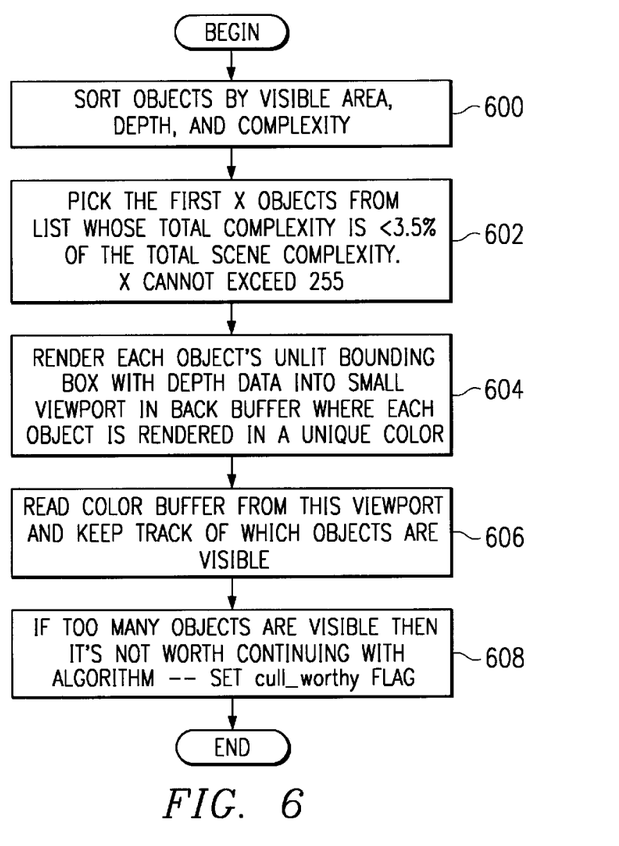
FIG. 6 is a flowchart of a process for picking occluders depicted in accordance with a preferred embodiment of the present invention.

With reference now to FIG. 6, a flowchart of a process for picking occluders is depicted in accordance with a preferred embodiment of the present invention. FIG. 6 is a more detailed description of step 510 in FIG. 5. The process begins by sorting objects based on a weighted sum of their visible area, depth, and complexity values (step 600). The weights given to each of these three attributes may vary depending on the implementation. In the depicted example, all three of the attributes are equally weighted. An object's visible area is ideally a measure of the number of pixels covered by the projection of its bounding box into the viewport. An object's depth is a measure of the distance in the z direction from the viewpoint to the closest point on the object's bounding box (in the positive z direction). Complexity may be determined by the number of primitives making up the object and also may take into account any texturing for the object. Because the objects will be sorted, the visible area value of each object only needs to be accurate with respect to the visible area values of all other objects. For example, if the actual visible areas for a set of objects range from 10 to 100, equivalent values would range from 1 to 10 after dividing the actual values by 10. The result of a sort on both sets of visible area values would produce the same ordering of objects.

Since the visible area value of each object only needs to accurate with respect to the visible area values of other objects, the visible areas can be approximated to enhance performance. The approximation may be performed by computing and storing the surface areas of three of the six faces of each object's bounding boxes during initialization of data structures performed in step 502 in FIG. 5. Each of the three faces will be perpendicular to either the x, y, or z coordinate axes. A vector can be formed from these area values. An object's visible area at a given view can then be approximated as the product of this vector with the eye vector, where the absolute value of each component product is taken and summed.

Thereafter, the first "X" objects are selected from the sorted list whose total complexity is less than an empirically determined value of 3.5% of the total scene complexity (step 602). "X" should be chosen based on the performance of the processor 202 in FIG. 2, the graphics processing system 300 in FIG. 3, and the type of objects being rendered. In this example, "X" cannot exceed 255 as explained below.

Next, each of the "X" objects is assigned a unique color and its bounding box is rendered in that color with depth data but no lighting in a small viewport in the back buffer (step 604). This is the "occluder selection viewport". The color buffer is then read from this viewport and visible objects are determined according to which colors appear in the buffer (step 606). For compatibility with a wide range of graphics processing systems, the present invention assumes that at least 256 colors can be represented by the graphics system (8 bit color). Using one color to represent the background (where no objects were rendered), this leaves a maximum of 255 objects which can be differentiated. As each pixel is read from the buffer, its color determines whether it represents an object or empty space. If it represents an object, that object is flagged as an occluder.

Two variables are maintained which represent the sum of the complexity values of all objects flagged as occluders (occluder_complexity), and the sum of the complexity values of all objects not flagged as occluders (occludee_complexity). Another variable, cull_worthy, is set to "TRUE" if the product of occludee_complexity and a weight factor exceeds the value of occluder_complexity (step 608). This weight factor is another empirically defined value. If cull_worthy is set to FALSE at any time during the pixel reading process, it is determined that it would be more efficient to draw all the objects than to continue with the present invention. Thereafter, the process returns or ends.

Figure 7:
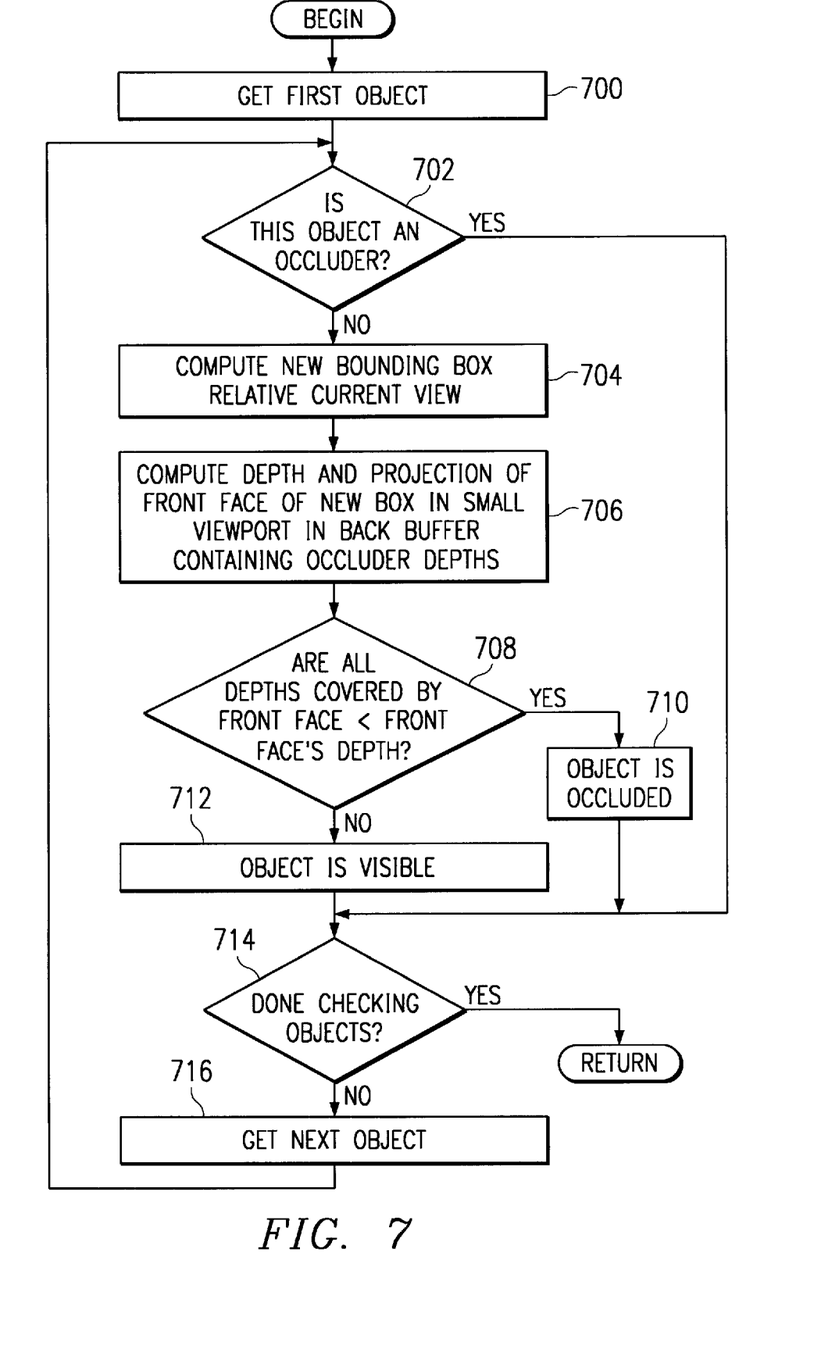
FIG. 7 is a flowchart of a process for testing objects for occlusion depicted in accordance with a preferred embodiment of the present invention.

With reference to FIG. 7, a flowchart of a process for testing for occlusion is depicted in accordance with a preferred embodiment of the present invention. FIG. 7 is a more detailed description of step 516 in FIG. 5.

The process begins by retrieving the first object in the input array of objects (step 700). The objects retrieved may include both occluders and other objects that have not been identified as occluders. A determination is then made as to whether this object has been flagged as an occluder (step 702). If the object is not an occluder, then a new bounding box is computed relative to the current view (step 704). The original bounding box is relative to a global coordinate system. The view, however, may not be axially aligned with the global coordinate system. As a result, a new bounding box is computed that is axially aligned with the view such that its front wall (closest face to the viewpoint) is parallel to the viewing plane. Thereafter, the process computes the depth and projection of the front wall of the new bounding box into a small viewport in the back buffer (the occlusion detection viewport) containing the depths of occluders which were rendered in step 515 in FIG. 5 (step 706). This projection is the wall's projected bounding box.

Thereafter, the depth of the front wall is compared to the depths of pixels which lie within the wall's projected bounding box (step 708). These depths are occluder depths and were obtained in step 515 in FIG. 5. The object is determined to be occluded if the front wall's depth is greater than the depth values of all pixels within the wall's projected bounding box (step 710). An object is only labeled as occluded if the entire object is occluded. Otherwise, the object is visible (step 712). In either instance, a determination is then made as to whether the checking of objects has finished (step 714). If the checking of objects has not finished, the process then obtains the next object (step 716) with the process then returning to step 702 as described above. Otherwise, the process returns.

With reference again to step 702, if the object is an occluder, the process proceeds directly to step 714 as described above.

Figure 8A:
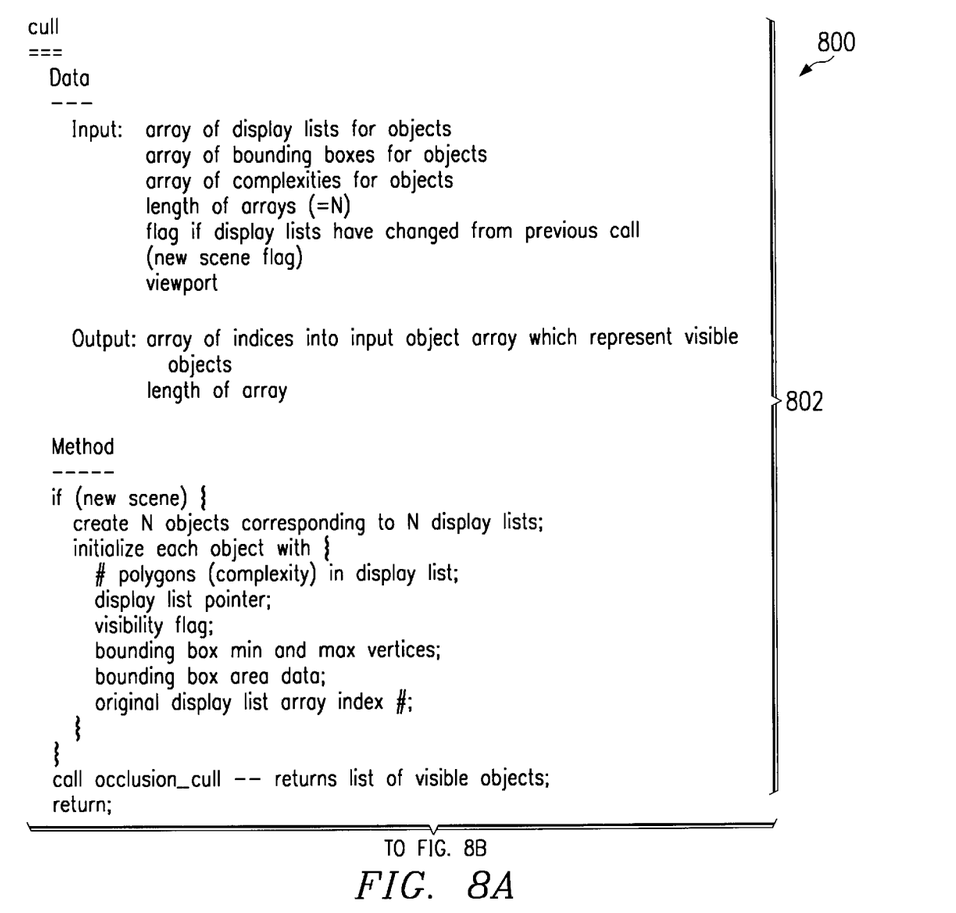
Figure 8B:
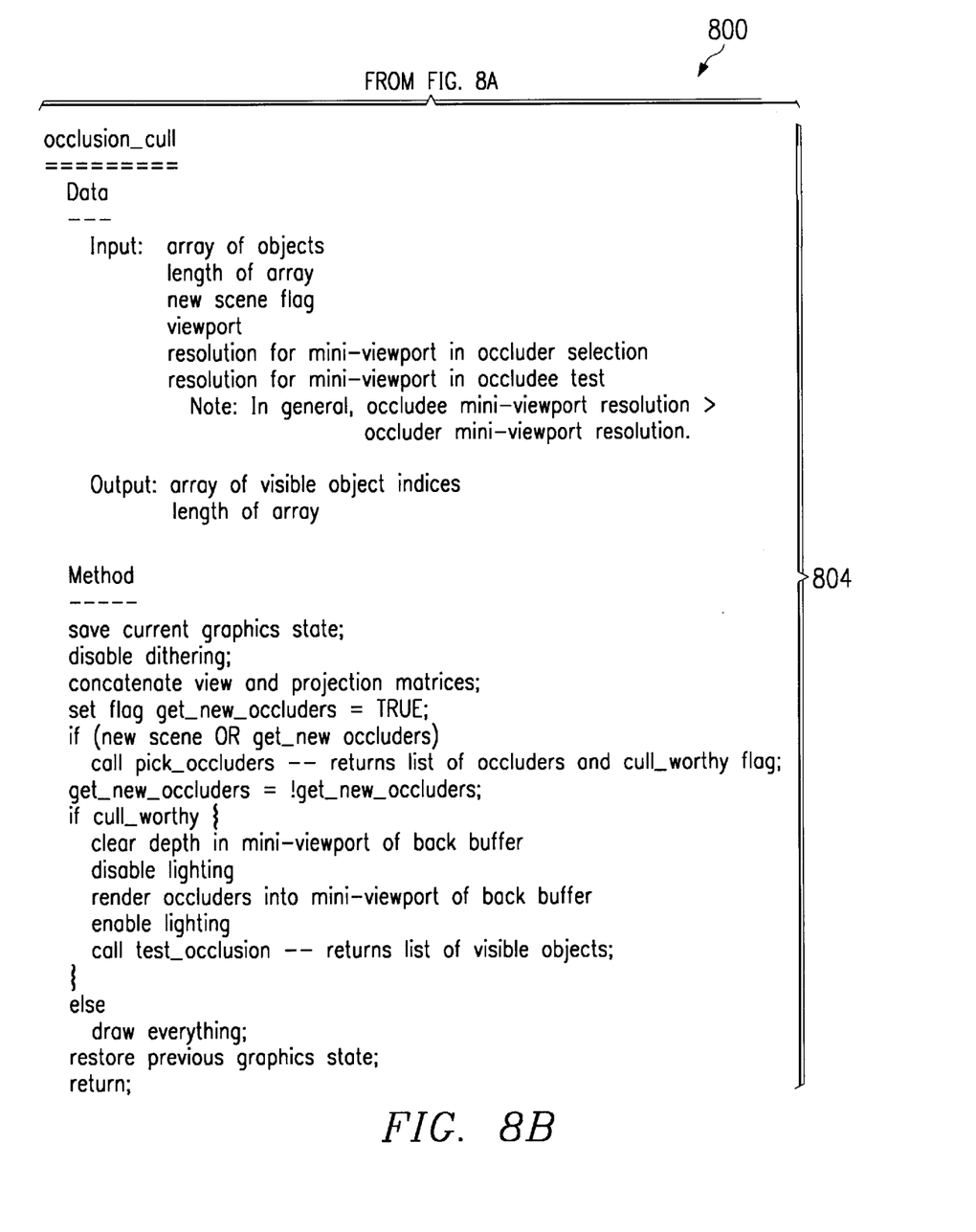
Figure 8D:
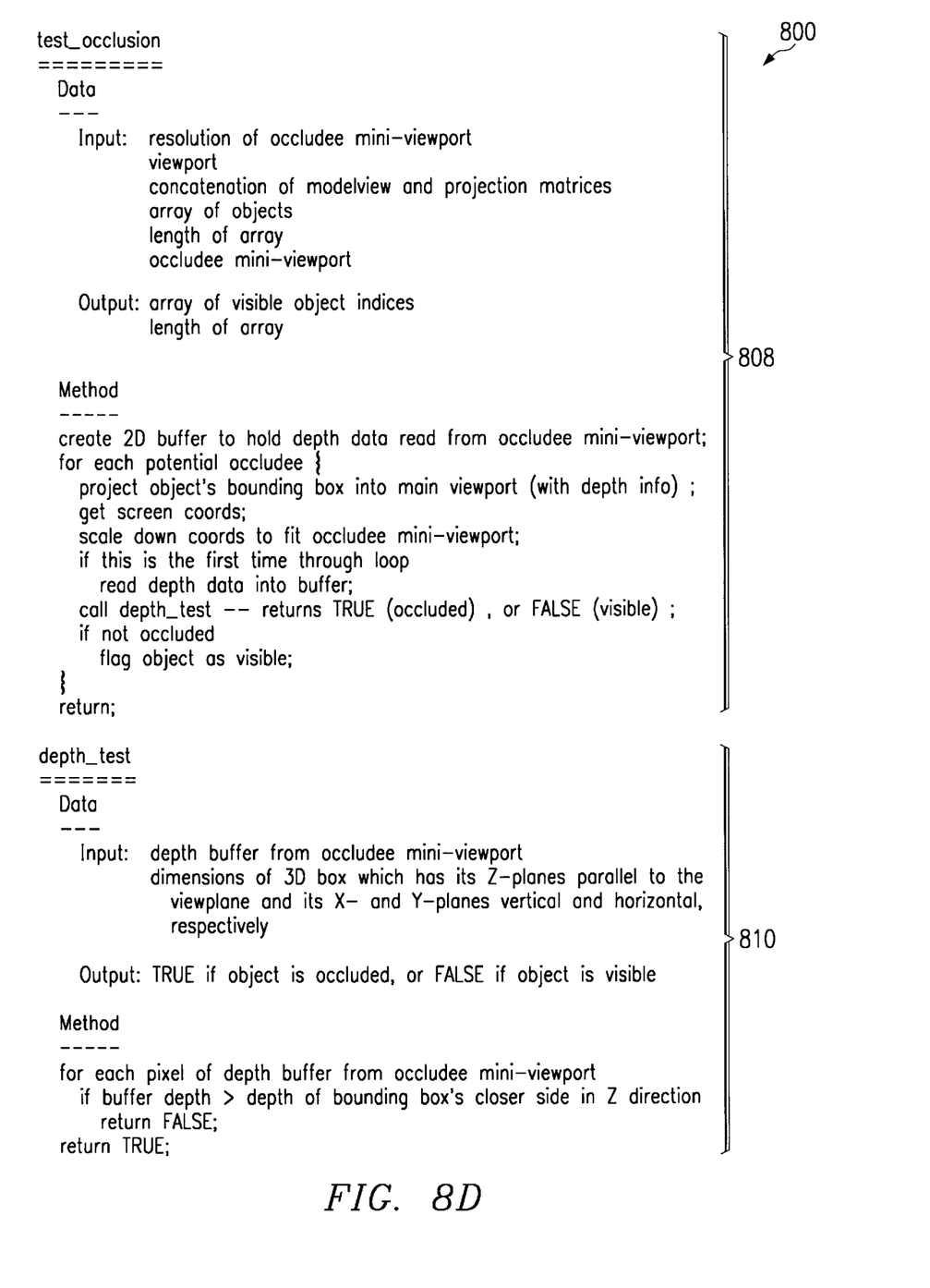

Turning now to FIGS. 8A–8C, diagrams of pseudo code used to identify visible objects are depicted in accordance with a preferred embodiment of the present invention. The pseudo code illustrated in FIGS. 8A–8C is used to determine which objects in a scene are visible from a given view. Further, this process also identifies objects that need not be drawn because these objects are blocked by visible objects. The process is most useful when the execution time of the process plus the rendering time of visible objects is less than rendering time of all objects that would normally be drawn for a scene.

In pseudo code 800, section 802 in FIG. 8A includes an identification of input and output data. An array of display lists of objects, an array of bounding boxes for objects, an array of complexities for objects, a length of the arrays (equal to the total number of input objects), a flag for a new scene (set to TRUE only if the display lists have changed since the previous time the process was executed), and a viewport are input data used by pseudo code 800. The output is an array of visible object indices which reference the input array of display lists, and the length of this array (equal to the number of visible objects). In section 802, a determination is made as to whether a new scene is being drawn. If a new scene is being drawn, then data structures are created for each of the objects. These data structures include the number of polygons, a display list pointer, a visibility flag, a bounding box containing minimum and maximum vertices, bounding box area data, and an original display list array index for the data structure.

Section 804 includes instructions to call various subroutines, such as pick occluders and test occlusion, which are illustrated in more detail in section 806 in FIG. 8B and 808 in FIG. 8C. The code in section 804 in FIG. 8A is used to save the current graphic state, pick occluders, test for occlusion to identify visible objects, and restore the graphics state. In section 806 in FIG. 8B, pseudo code is used to identify occluders and to determine whether the process should continue based on the complexity of the selected occluders and the complexity of the remaining objects. The pseudo code in section 808 in FIG. 8C is used to test for occlusion to identify which objects are occluded. Objects that are partially visible are identified as visible objects in accordance with a preferred embodiment of the present invention. Only objects that are totally occluded are identified as occluded objects. The code in section 808 includes a depth test cull, which calls code illustrated in section 810. This code is used to identify the depth of each pixel within a projected bounding box in the depth buffer.

Figure 9A:
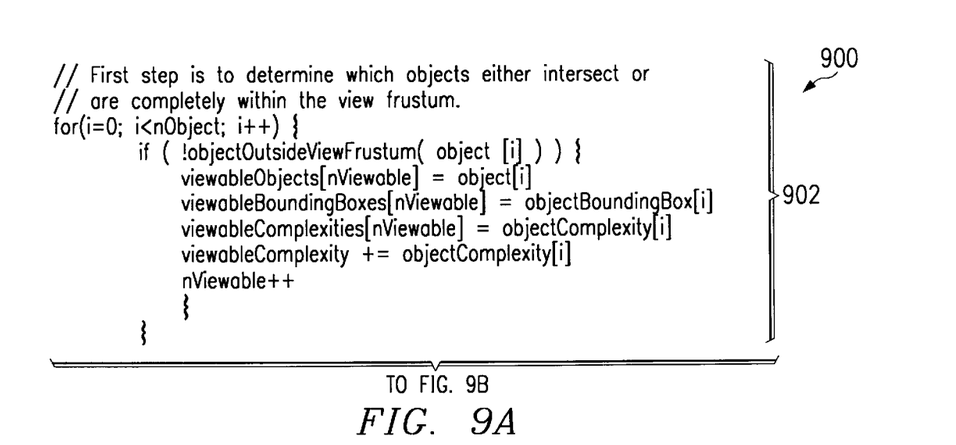
FIGS. 9A–9B is an illustration of pseudo code used to determine whether to run the occlusion culling processes of the present invention for identifying occluded objects depicted in accordance with a preferred embodiment of the present invention.
Figure 9B:
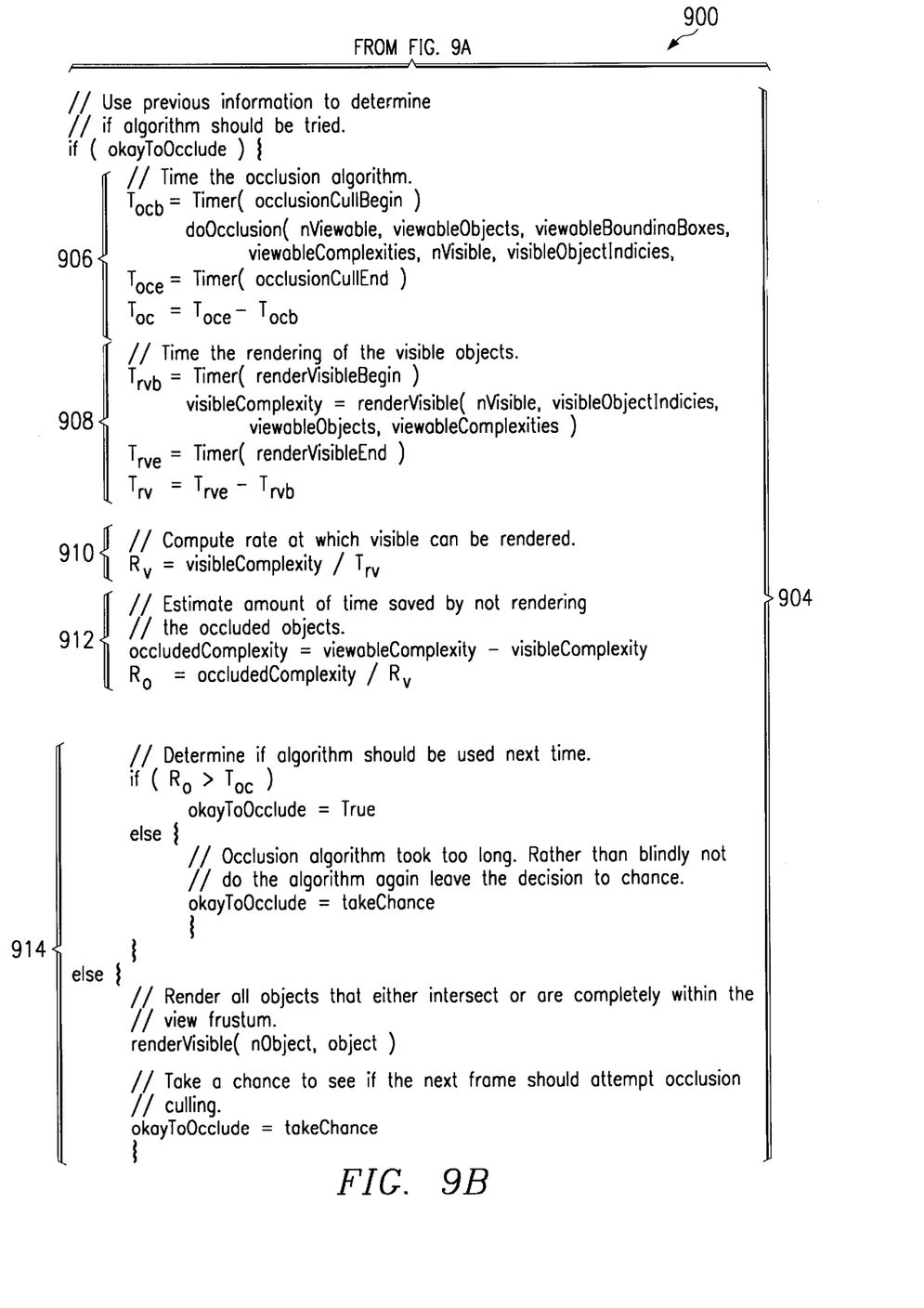

With reference now to FIG. 9, an illustration of pseudo code used to determine whether to run the occlusion culling processes of the present invention for identifying occluded objects is depicted in accordance with a preferred embodiment of the present invention. Pseudo code 900 includes instructions to determine whether objects intersect or are completely in the view frustum in section 902. Thereafter, a determination of whether to use the occlusion culling process of the present invention is made by the instructions in section 904. Basically, these instructions time or measure the amount of time used to run the occlusion process in section 906. In section 908, the rendering time of visible objects is identified as the rate at which the visible objects can be rendered is identified by the code in section 910. The amount of time saved by not rendering the occluded objects is estimated in section 912. A determination of whether to use the process the next time is made by the instructions in section 914.

Eligibility criteria is used to identify good candidate scenes for using the mechanism of the present invention. The process should execute faster than the rendering time of all objects declared as occluded. For bad candidate scenes, the process is terminated and normal rendering is performed.

A good candidate for the mechanism of the present invention is a scene in which a certain percentage of its total complexity is obscured. The percentage is an empirical value based on various factors, such as graphic hardware, processor speed, OpenGL implementation on a graphics port, the types of objects being seen, and the type of timing test.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. Although the depicted example is directed towards processing objects, the processes of the present invention also may be applied to other items, such as a polygon or primitive. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for displaying a drawing for a view point, wherein the drawing includes a set of objects, the method comprising the computer implemented steps of:

receiving a plurality of bounding boxes and complexity data for the set of objects, wherein a bounding box and complexity data is associated with each object within the set of objects;

selecting occluders within the set of objects using the plurality of bounding boxes; and identifying objects from the set of objects that are visible for the viewpoint.

2. The method of claim 1, wherein the objects are identified objects and further comprising:

displaying the identified objects.

3. The method of claim 2 further comprising:

determining a first amount of time used to perform the selecting, identifying, and displaying steps;

determining a second amount of time used to display the set of objects without performing the selecting and identifying steps; and responsive to the first amount of time being greater than the second amount of time, preventing performance of the selecting and identifying steps in displaying the set of objects.

4. The method of claim 1, wherein pixel depth data is associated with each occluder and wherein the step of identifying objects from the set of objects that are visible includes:

determining whether a depth of the bounding box for an object within the set of objects is closer to the viewpoint than a depth of a pixel for an occluder.

5. The method of claim 4, wherein pixel depth data is generated by rendering occluders in full detail with depth information at a low resolution to generate the pixel depth data.

6. The method of claim 1, wherein the step of selecting occluders comprises:

sorting the set of objects by complexity; and selecting a number of objects from the set of objects whose total complexity is less than a set percentage of a complexity of the drawing.

7. The method of claim 6, wherein the number of objects is less than 255.

8. The method of claim 7, wherein the percentage is 3.5 percent.

9. The method of claim 1, wherein the step of estimating includes:

identifying objects within the set of objects having an overall largest visible area, closest depth values, and lowest complexity values.

10. The method of claim 1, wherein the complexity data includes a time required to render an object.

11. The method of claim 1 further comprising:

determining whether a total complexity of the occluders greater than complexity of remaining parts.

12. The method of claim 11, wherein the step of determining whether other objects are visible is responsive to a determination that the complexity of the occluders is less than the complexity of the remaining parts.

13. A method in a data processing system for processing a scene for a viewpoint, wherein the scene contains a plurality of objects, the method comprising the data processing steps of:

receiving data for the scene, the scene comprising a plurality of objects, each object having a complexity value;

selecting a first set of visible objects, which have a complexity value greater than a selected threshold, from the plurality of objects;

rendering the first set of visible objects in order to obtain depth data;

using the depth data to select a second set of visible objects from the plurality of objects in the scene that were not selected in the first set; and displaying the first and second set of visible objects as being visible to the viewpoint.

14. A method in a data processing system for processing a scene for a viewpoint, wherein the scene contains a plurality of objects, the method comprising the data processing system steps of:

receiving data for the scene, wherein the data includes bounding boxes for the plurality of objects and complexity data for the plurality of objects;

selecting a set of visible objects from the plurality of objects using the data for the scene; and identifying objects visible to the viewpoint by comparing unselected objects from the plurality of objects to the set of visible objects.

15. The method of claim 14, wherein pixel depth data is associated with each visible object and wherein the step of identifying whether other objects from the set of objects are visible comprises:

determining whether a depth of the bounding box is closer to the viewpoint than a depth of a pixel for an occluder.

16. A data processing system for displaying a drawing for a view point, wherein the drawing includes a set of objects, the data processing system comprising:

receiving means for receiving a plurality of bounding boxes and complexity data for the set of objects, wherein a bounding box and complexity data is associated with each object within the set of objects;

selecting means for selecting occluders within the set of objects using the plurality of bounding boxes; and identifying means for identifying objects from the set of objects that are visible for the viewpoint.

17. The data processing system of claim 16, wherein the objects are identified objects and further comprising:

displaying means for displaying the identified objects.

18. The data processing system of claim 17 further comprising:

first determining means for determining a first amount of time used to perform the selecting, identifying, and displaying steps;

second determining means for determining a second amount of time used to display the set of objects without performing the selecting and identifying steps; and preventing means, responsive to the first amount of time being greater than the second amount of time, for preventing limitation of the selecting and identifying means in displaying the set of objects.

19. The data processing system of claim 16, wherein pixel depth data is associated with each occluder and wherein the step of identifying objects from the set of objects that are visible includes:

determining means for determining whether a depth of the bounding box for an object within the set of objects is closer to the viewpoint than a depth of a pixel for an occluder.

20. The data processing system of claim 19, wherein pixel depth data is generated by rendering occluders in full detail with depth information at a low resolution to generate the pixel depth data.

21. The data processing system of claim 16, wherein the selecting means of selecting occluders comprises:

sorting means for sorting the set of objects by complexity; and selecting means for selecting a number of objects from the set of objects whose total complexity is less than a set percentage of a complexity of the drawing.

22. The data processing system of claim 21, wherein the number of objects is less than 255.

23. The data processing system of claim 22, wherein the percentage is 3.5 percent.

24. The data processing system of claim 16, wherein the estimation means includes:
   identifying means for identifying objects within the set of objects having an overall largest visible area, closest depth values, and lowest complexity values.

25. The data processing system of claim 16, wherein the complexity data includes a time required to render an object.

26. The data processing system of claim 16 further comprising:
   determining means for determining whether a total complexity of the occluders greater than complexity of remaining parts.

27. The data processing system of claim 26, wherein the determining means whether other objects are visible is responsive to a determination that the complexity of the occluders is less than the complexity of the remaining parts.

28. A data processing system for processing a scene for a viewpoint, wherein the scene contains a plurality of objects, the data processing steps comprising:
   receiving means for receiving data for the scene, the scene comprising a plurality of objects, each object having a complexity value;
   first selecting means for selecting a first set of visible objects, which have a complexity value greater than a selected threshold, from the plurality of objects;
   rendering means for rendering the first set of visible objects in order to obtain depth data;
   second selecting means for using the depth data to select a second set of visible objects from the plurality of objects in the scene that were not selected in the first set; and
   displaying means for displaying the first and second set of visible objects as being visible to the viewpoint.

29. A data processing system for processing a scene for a viewpoint, wherein the scene contains a plurality of objects, the data processing system comprising:
   receiving means for receiving data for the scene, wherein the data includes bounding boxes for the plurality of objects and complexity data for the plurality of objects;
   selecting means for selecting a set of visible objects from the plurality of objects using the data for the scene; and
   identifying means for identifying objects visible to the viewpoint by comparing unselected objects from the plurality of objects to the set of visible objects.

30. The data processing system of claim 29, wherein pixel depth data is associated with each visible object and wherein the step of identifying whether other objects from the set of objects are visible comprises:
   determining means for determining whether a depth of the bounding box is closer to the viewpoint than a depth of a pixel for an occluder.

31. A computer program product in a computer readable medium for displaying a drawing for a view point, wherein the drawing includes a set of objects, the computer program product comprising:
   first instructions for receiving a plurality of bounding boxes and complexity data for the set of objects, wherein a bounding box and complexity data is associated with each object within the set of objects;
   second instructions for selecting occluders within the set of objects using the plurality of bounding boxes; and
   third instructions for identifying objects from the set of objects that are visible for the viewpoint.

32. A computer program product in a computer readable medium for processing a scene for a viewpoint, wherein the scene contains a plurality of objects, the computer program product comprising:
   first instructions for receiving data for the scene, the scene comprising a plurality of objects, each object having a complexity value;
   second instructions for selecting a first set of visible objects, which have a complexity value greater than a selected threshold, from the plurality of objects;
   third instructions for rendering the first set of visible objects in order to obtain depth data;
   fourth instructions for using the depth data to select a second set of visible objects from the plurality of objects in the scene that were not selected in the first set; and
   fifth instructions for displaying the first and second set of visible objects as being visible to the viewpoint.

\* \* \* \* \*

UNITED STATES PATENT AND TRADEMARK OFFICE
CERTIFICATE OF CORRECTION

PATENT NO. : 6,603,474 B1  Page 1 of 1
APPLICATION NO. : 09/321787
DATED : August 5, 2003
INVENTOR(S) : Cobb et al.

It is certified that error appears in the above-identified patent and that said Letters Patent is hereby corrected as shown below:

Col. 9, line 18: after "FIGS." delete "8A-8C" and insert --8A-8D--.

Col. 9, line 21: after "FIGS." delete "8A-8C" and insert --8A-8D--.

Col. 9, line 47: after "804" insert --in Figure 8B--.

Col. 9, line 50: after "804 in FIG." delete "8A" and insert --8B--.

Col. 9, line 53: after "FIG." delete "8B" and insert --8C--.

Col. 9, line 57: after "FIG." delete "8C" and insert --8D--.

Col. 9, line 66: after "FIG." delete "9" and insert --Figures 9A-9B--.

Col. 10, line 3: after "invention." delete "Pseudo" and insert --In Figure 9A, pseudo--.

Col. 10, line 8: after "904" insert --in Figure 9B--.

Signed and Sealed this

Twenty-seventh Day of March, 2007

JON W. DUDAS
*Director of the United States Patent and Trademark Office*